United States Patent
Jeon

(10) Patent No.: US 7,124,661 B2
(45) Date of Patent: Oct. 24, 2006

(54) PARKING LEVEL APPARATUS OF A VEHICLE

(75) Inventor: Kap Bae Jeon, Gwangmyeong (KR)

(73) Assignee: Kia Motors Corporation, Seoul (KR)

( * ) Notice: Subject to any disclaimer, the term of this patent is extended or adjusted under 35 U.S.C. 154(b) by 271 days.

(21) Appl. No.: 10/751,044

(22) Filed: Dec. 31, 2003

(65) Prior Publication Data

US 2005/0029057 A1 Feb. 10, 2005

(30) Foreign Application Priority Data

Aug. 5, 2003 (KR) ................ 10-2003-0054105

(51) Int. Cl.
*F16C 1/22* (2006.01)

(52) U.S. Cl. ........................ 74/502.6; 74/523

(58) Field of Classification Search ............... 188/2 D, 188/106 R, 106 P; 74/502, 502.6, 523, 524, 74/566; 192/18 R, 219.4

See application file for complete search history.

(56) References Cited

U.S. PATENT DOCUMENTS

| 4,667,785 A | * | 5/1987 | Toyoda et al. ............ 192/13 A |
| 5,303,609 A | * | 4/1994 | Iwanaga et al. .............. 74/523 |
| 5,755,313 A | * | 5/1998 | Kim ....................... 192/219.6 |
| 6,648,107 B1 | * | 11/2003 | Lundholm et al. .......... 188/156 |

FOREIGN PATENT DOCUMENTS

KR 0125691 6/1998

* cited by examiner

*Primary Examiner*—Chris Schwartz
(74) *Attorney, Agent, or Firm*—Morgan Lewis & Blockius LLP

(57) ABSTRACT

A parking lever of a vehicle includes a slider of a predetermined length mounted to a lower area of a lever assembly. Also, a guide rail into which the slider is inserted is formed in a casing. The slider undergoes a sliding movement within the guide rail such that when the lever assembly is operated, the slider covers exposed areas of the guide opening of the casing.

10 Claims, 3 Drawing Sheets

PARKING LEVEL APPARATUS OF A VEHICLE

CROSS-REFERENCE TO RELATED APPLICATIONS

This application claims priority of Korean Application No. 10-2003-0054105, filed on Aug. 5, 2003, the disclosure of which is incorporated fully herein by reference.

FIELD OF THE INVENTION

The present invention relates to a parking lever apparatus, and more particularly, to a parking lever apparatus of a vehicle in which an exposed area that appears during operation of the parking lever apparatus is covered by a slider made of a soft material to thereby enhance the appearance of the interior space of the vehicle and minimize the amount of space needed to mount the parking lever apparatus.

BACKGROUND OF THE INVENTION

A parking brake is typically used when a vehicle is parked for long periods, and is independently formed from the brake pedal used during vehicle operation. Another application of the parking brake is when the vehicle is on an incline and assistance is needed to prevent the vehicle from moving backward (this technique is generally used when the vehicle has a manual transmission).

In conventional parking brakes, a cover plate, which is made of a plastic material of a predetermined hardness, is extended a predetermined distance from a lever assembly. It is thus necessary that the lever assembly be set to at least a predetermined height so that it does not interfere with the vehicle body mounting when the lever assembly is operated. That is, when the lever assembly is used when the distance between the lever assembly and the mounting is large, the durability of the lever assembly is decreased, and it is necessary to provide a significant amount of installation space. Therefore, there is a limited degree of freedom in design.

Further, since the cover plate can cover only areas corresponding to the trace of the lever assembly during operation of the same, some areas inside the casing go uncovered.

SUMMARY OF THE INVENTION

In one exemplary embodiment of the present invention, there is provided a parking lever apparatus of a vehicle that includes a slider of a highly flexible material to fully cover exposed areas during operation of a lever apparatus, and minimizes an installation space to thereby realize an increased freedom of design.

In an exemplary embodiment of the present invention, a parking lever apparatus of a vehicle includes a lever assembly rotatably connected on a bracket by a hinge. The bracket is fixed to a mount on the vehicle body and a handle is connected to a distal end of the lever assembly.

Further, a parking cable is connected to the lever assembly and is pulled by operation of the lever assembly such that a brake shoe is closely contacted to a drum to thereby generate a braking force. A casing is connected to the mount and covers part of the lever assembly. The casing includes a guide opening through which the handle and part of the lever assembly is passed.

In addition, a slider of a predetermined length is mounted to a lower area of the lever assembly, and a guide rail into which the slider is inserted is formed in the casing. The slider undergoes a sliding movement within the guide rail such that when the lever assembly is operated, the slider covers the guide opening of the casing. That is, if the lever assembly is pulled upward to engage the parking brake, the slider moves along the guide rail to fully cover the area in the guide opening of the casing that would otherwise be exposed.

In a further embodiment, the guide rail has a generally horizontal end at its distal portion from the hinge, and it rises as it gets closer to the hinge.

In another further embodiment, the guide rail includes a convex portion that is convex with respect to an interior side of the casing.

In a still further embodiment, a projection is formed at an end of the slider, and a stopper for interfering with the projection is formed at the guide rail.

In addition, in a still further embodiment, an embodiment of the present invention further includes a cover for covering the guide rail, and the stopper is formed on a lower side of the cover.

BRIEF DESCRIPTION OF THE DRAWINGS

The accompanying drawings, which together with the specification, illustrate an exemplary embodiment of the present invention, and, together with the description, serve to explain the principles of the present invention.

DETAILED DESCRIPTION

Figure 1:
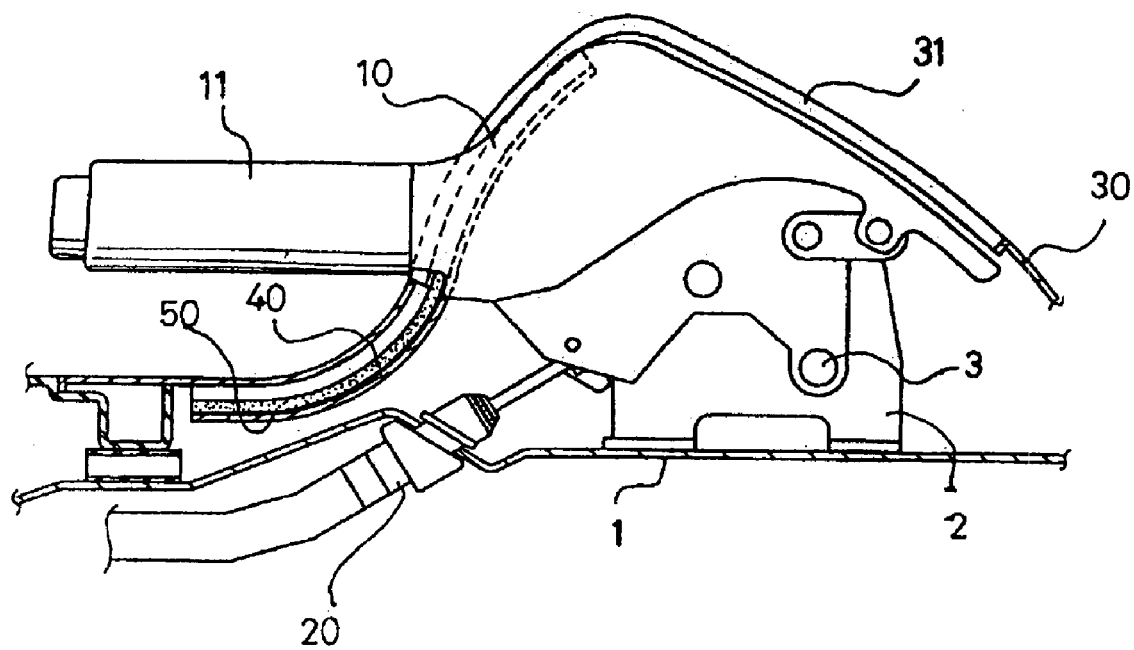
FIG. 1 is a partial sectional view of main elements of a parking lever apparatus according to an exemplary embodiment of the present invention.

An exemplary embodiment of the present invention will now be described in detail with reference to the accompanying drawings.

With reference to the drawings, a parking brake lever apparatus according to an embodiment of the invention includes a lever assembly 10 that is rotatably connected on a bracket 2 by a hinge 3. The bracket 2 is fixed to a mounting 1. When operated, the lever assembly 10 pulls a parking cable 20 such that a brake shoe is closely contacted to a drum to thereby generate a braking force.

A handle 11 that is manipulated by the driver is provided on a distal end of the lever assembly 10. Although not shown, a locking member is mounted to the lever assembly 10. The locking member allows operation of the lever assembly 10 only when it is disengaged.

In addition, a casing 30 covers part of the lever assembly 10. The casing 30 includes a guide opening 31 through which the handle 11 and part of the lever assembly 10 is passed through. The guide opening 31 is formed to predetermined dimensions and acts to guide the motion of the lever assembly 10 during operation of the same.

One end of the lever assembly 10 is rotatably mounted by the hinge 3 as described above, and its other end is mounted facing a front of the vehicle body such that when the lever assembly 10 is raised, an exposed region is formed toward a lower area of the lever assembly 10. A slider 40 is therefore mounted to the lower area of the lever assembly 10 to cover this exposed region.

The slider 40 is made to a length sufficient to cover the exposed region formed between the lever assembly 10 and the guide opening 31 of the casing 30. Further, the slider 40 is made of a soft, flexible material such that movement of the slider 40 within a guide rail 50 (to be described below) is possible regardless of how the guide rail 50 is formed.

The guide rail 50 is formed in the casing 30. The slider 40 is inserted into the guide rail 50 and undergoes a sliding motion therein as the lever assembly 10 is operated. The guide rail 50 guides the movement of the slider 40 in a state where the slider 40 is inserted therein such that the exposed areas of the lever assembly 10 are covered during operation of the same.

In more detail, the guide rail 50 has a generally horizontal end at its distal portion from the hinge 3, and it rises as it gets closer to the hinge 3.

Such a guide rail 50 includes a convex portion that is convex with respect to an interior side of the casing 30 (refer to a portion of the guide rail 50 distal from the hinge 3). Since the distal portion of the guide rail 50 from the hinge 3 becomes horizontal, the overall height of the parking lever apparatus may be reduced.

According to the prior art, a member for covering an exposed portion of a parking lever apparatus is of an arc shape (i.e., concave with respect to an interior side of a casing). However, according to the present embodiment, due to the portion of the guide rail 50 that is convex with respect to the interior side of the casing 30, an angular width of a parking lever apparatus with respect to the hinge 3 may be reduced.

Figure 2:
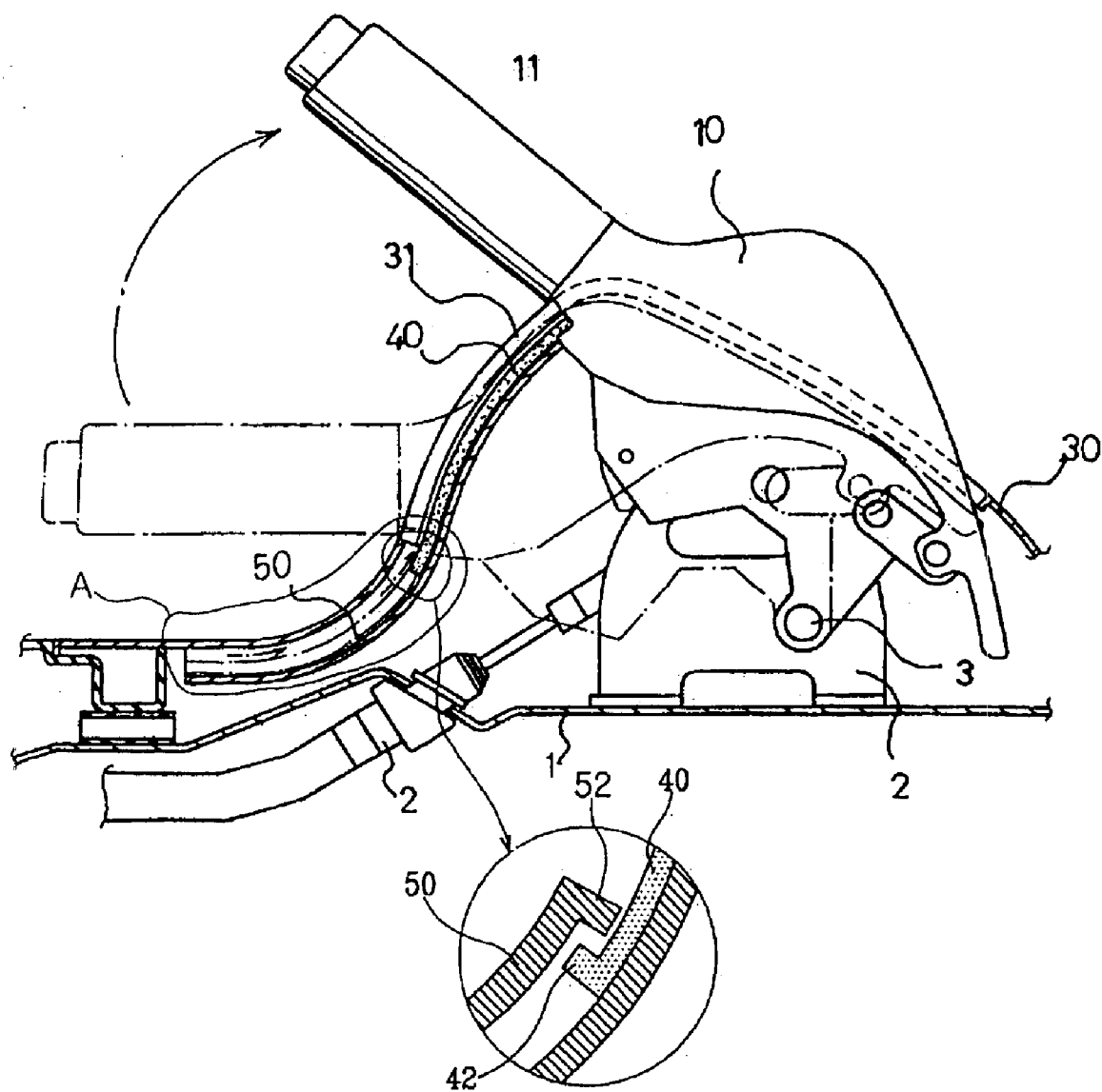
FIG. 2 is a partial sectional view of main elements of the parking lever apparatus of FIG. 1 during operation of the same.

In addition, as shown in FIG. 2, a projection 42 is formed at an end of the slider 40, and a stopper 52 for interfering with the projection 42 is formed at the guide rail 50.

Therefore, escaping of the slider 40 from the guide rail 50 may be prevented during an operation of the parking lever apparatus. In addition, an operational stroke of the lever assembly 10 may be limited by the projection 42 and the stopper. That is, according to an embodiment of the present invention, both limiting the operational stroke of the lever assembly 10 and preventing escape of the slider 40 from the guide rail 50 are achieved by one stopper mechanism.

According to an embodiment of the present invention, the stopper 52 is formed at a separated cover 55 (refer to FIG. 2) for covering the guide rail 50.

Figure 3:
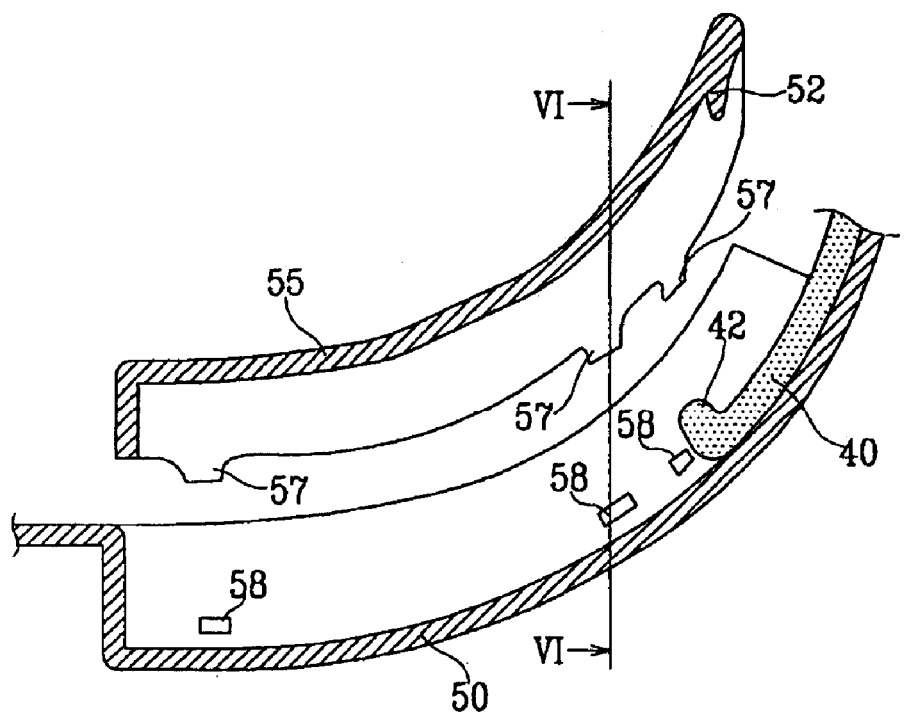
FIG. 3 is an exploded and enlarged view of a portion A of FIG. 2.
Figure 4:
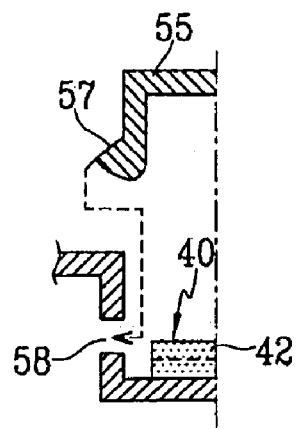
FIG. 4 is a sectional view of FIG. 3 along a line VI—VI.

As shown in FIGS. 3 and 4, catching projections 57 are formed on a side wall of the cover 55, and catching holes 58 for engaging with the catching projections 57 are formed on a side wall of the guide rail 50. The stopper 52 is formed on a lower side of the cover 55 at its upper end.

In an assembling process, the slider 40 is laid on the guide rail 50, and then the cover 55 engages with the guide rail 50 for covering it. Therefore, when they are assembled as such, movement of the slider 40 is limited by interference of the projection 42 formed at an end of the slider 40 and the stopper 52 formed on the lower side of the cover 55.

With reference to FIG. 2, in order to engage the parking brake from a state where it is disengaged, the lever assembly 10 is unlocked then pulled upward by the driver. As a result, the slider 40 provided to the lower area of the lever assembly 10 moves along the guide rail 50 to enter the area in the guide opening 31 of the casing 30 that would otherwise be exposed. That is, this area is covered by the slider 40 through this operation.

Further, when the lever assembly 10 is in a disengaged state such that there is no exposed region in the guide opening 31 of the casing 30, the slider 40 is positioned inserted in the guide rail 50. Therefore, no extra space is needed for this element.

Although not shown in the drawings, if an exposed region develops also to rear area of the lever assembly 10 (in addition to the front area as described above), the slider 40 and guide opening 31 configuration may also be provided to the rear area of the lever assembly 10 such that all exposes areas are covered. Such a structure is included within the scope of the present invention.

In an embodiment of the present invention, when the lever assembly is pulled upward by the driver, the slider moves along the guide rail such that the exposed region in the guide opening of the casing is covered. Further, a height of the lever assembly starting from the mounting may be set to a minimal level such that an increased freedom of design and strength may be obtained. As a result of these advantages, the durablity of the parking brake may be enhanced and the overall appearance of the vehicle may be increased.

Although an embodiment of the present invention has been described in detail hereinabove in connection with a certain exemplary embodiment, it should be understood that the invention is not limited to the disclosed exemplary embodiment, but, on the contrary is intended to cover various modifications and/or equivalent arrangements included within the spirit and scope of the present invention, as defined in the appended claims.

What is claimed is:

1. A parking lever apparatus of a vehicle, comprising:
   a lever assembly rotatably connected on a bracket by a hinge, the bracket being fixed to a mounting member securable to a vehicle body and a handle being connected to a distal end of the lever assembly;
   a parking cable connected to the lever assembly to be pulled by operation of the lever assembly for actuation of a brake mechanism; and
   a casing connected to the mounting member and covering part of the lever assembly, the casing including a guide opening through which the handle and part of the lever assembly is passed,
   wherein a slider of a predetermined length is mounted to a lower area of the lever assembly, and a guide rail into which the slider is inserted is formed in the casing, the slider undergoing a sliding movement within the guide rail such that when the lever assembly is operated, the slider covers a lower portion of the guide opening of the casing the lower portion being lower than the lever assembly.

2. The parking lever apparatus of claim 1, wherein the slider is made of a soft, flexible material.

3. The parking lever apparatus of claim 2, wherein the guide rail has a generally horizontal end at its distal portion from the hinge, and it rises as it gets closer to the hinge.

4. The parking lever apparatus of claim 3, wherein a projection is formed at an end of the slider, and a stopper for interfering with the projection is formed at the guide rail.

5. The parking lever apparatus of claim 4, further comprising a cover for covering the guide rail, wherein the stopper is formed on a lower side of the cover.

6. The parking lever apparatus of claim 2, wherein the guide rail comprises a convex portion that is convex with respect to an interior side of the casing.

7. The parking lever apparatus of claim 6, wherein a projection is formed at an end of the slider, and a stopper for interfering with the projection is formed at the guide rail.

8. The parking lever apparatus of claim 7, further comprising a cover for covering the guide rail, wherein the stopper is formed on a lower side of the cover.

9. The parking lever apparatus of claim 2, wherein a projection is formed at an end of the slider, and a stopper for interfering with the projection is formed at the guide rail.

10. The parking lever apparatus of claim 9, further comprising a cover for covering the guide rail, wherein the stopper is formed on a lower side of the cover.

* * * * *